(12) United States Patent
Buchmann et al.

(10) Patent No.: US 9,703,833 B2
(45) Date of Patent: Jul. 11, 2017

(54) UNIFICATION OF SEARCH AND ANALYTICS

(71) Applicants: Daniel Buchmann, Eggenstein (DE); Waldemar Porscha, Walldorf (DE); Marco Pesarese, Nussloch (DE); Frank Michels, Speyer (DE); Florian Kresser, Lobbach (DE); Christian Münkel, Reilingen (DE)

(72) Inventors: Daniel Buchmann, Eggenstein (DE); Waldemar Porscha, Walldorf (DE); Marco Pesarese, Nussloch (DE); Frank Michels, Speyer (DE); Florian Kresser, Lobbach (DE); Christian Münkel, Reilingen (DE)

(73) Assignee: SAP SE, Walldorf (DE)

( * ) Notice: Subject to any disclaimer, the term of this patent is extended or adjusted under 35 U.S.C. 154(b) by 144 days.

(21) Appl. No.: 13/690,510

(22) Filed: Nov. 30, 2012

(65) Prior Publication Data

US 2014/0156634 A1      Jun. 5, 2014

(51) Int. Cl.
*G06F 17/30* (2006.01)

(52) U.S. Cl.
CPC .. *G06F 17/30466* (2013.01); *G06F 17/30572* (2013.01)

(58) Field of Classification Search
CPC ............ G06F 17/30466; G06F 17/30572
See application file for complete search history.

(56) References Cited

U.S. PATENT DOCUMENTS

| | | | |
|---|---|---|---|
| 5,386,556 A * | 1/1995 | Hedin et al. | |
| 6,282,537 B1 * | 8/2001 | Madnick | G06F 17/30427 707/716 |
| 8,997,091 B1 * | 3/2015 | Watson | G06F 8/60 717/170 |
| 2005/0262087 A1 * | 11/2005 | Wu | G06F 17/30289 |
| 2006/0195420 A1 | 8/2006 | Kilroy | |
| 2009/0271158 A1 * | 10/2009 | Yeh | G06F 17/30592 703/2 |
| 2014/0040306 A1 * | 2/2014 | Gluzman Peregrine | G06Q 10/0639 707/769 |

FOREIGN PATENT DOCUMENTS

EP      1777630 A1      4/2007

OTHER PUBLICATIONS

"Just-In-Time Data Distribution for Analytical Query Processing" Milena Ivanova. Manin Kersten. and Fabian Groffen (Sep. 21, 2012).*

(Continued)

*Primary Examiner* — Shew-Fen Lin
(74) *Attorney, Agent, or Firm* — Buckley, Maschoff & Talwalkar LLC

(57) ABSTRACT

A system includes reception of a request conforming to a modeled query and join filter criteria, the request comprising a first subrequest associated with a search attribute view and a second subrequest associated with an analytical view, definition of a join between the search attribute view and the analytical view based on one or more view attributes of the search attribute view, and filtering of a result set associated with the first subrequest based on the join and on the join filter criteria.

9 Claims, 11 Drawing Sheets

(56) References Cited

OTHER PUBLICATIONS

"Analytic Functins by Example" Shouvik Basu, http://www.orafaq.com/node/55, as archived by archive.org (Mar. 13, 2006).*
Yang, Xiaoyan et al., "Recommending Join Queries Via Query Log Analysis", IEEE International Conference on Data Engineering, Mar. 29, 2009, 12 pp.
"Extended European Search Report" dated May 23, 2016 for European Application No. 13195155.0, 7 pp.

* cited by examiner

UNIFICATION OF SEARCH AND ANALYTICS

BACKGROUND

Conventional software tools allow users to access data stored within database systems. These tools may be categorized as search tools, which allow users to retrieve stored data corresponding to search terms, and analytics tools, which allow users to perform calculations and analysis based on the stored data. These tools and the back-end systems which serve them are minimally integrated, if at all.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
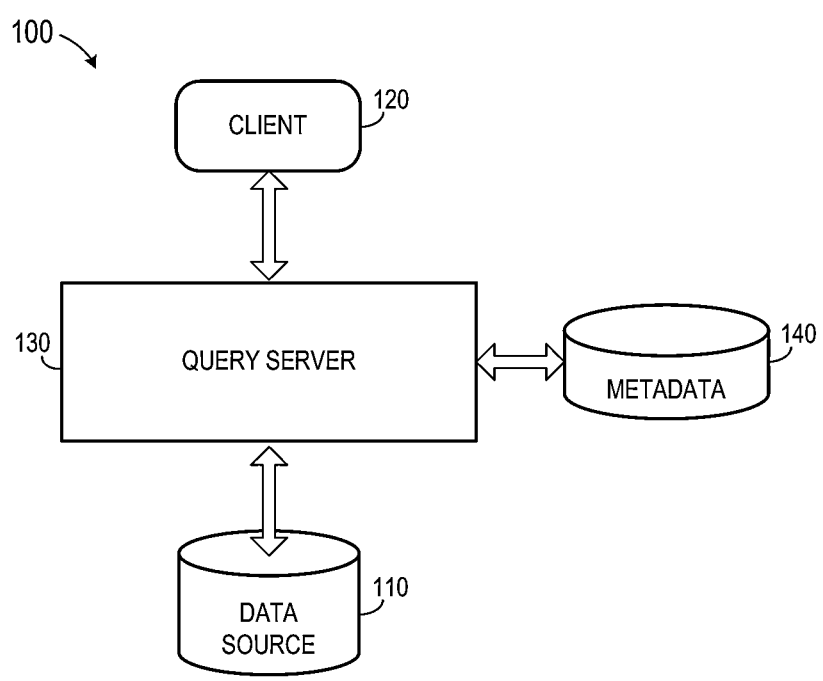
FIG. 1 is a block diagram of a system according to some embodiments.

FIG. 1 is a block diagram of system 100 according to some embodiments. System 100 includes data source 110, client 120, and query server 130. Data source 110 may comprise any query-responsive data source or sources that are or become known, including but not limited to a structured-query language (SQL) relational database management system. Data source 110 may comprise a relational database, a multi-dimensional database, an eXtendable Markup Language (XML) document, or any other data storage system storing structured and/or unstructured data. The data of data source 110 may be distributed among several relational databases, multi-dimensional databases, and/or other data sources. Embodiments are not limited to any number or types of data sources. For example, data source 110 may comprise one or more OnLine Analytical Processing (OLAP) databases, spreadsheets, text documents, presentations, etc.

In some embodiments, data source 110 is implemented in Random Access Memory (e.g., cache memory for storing recently-used data) and one or more fixed disks (e.g., persistent memory for storing their respective portions of the full database). Alternatively, data source 110 may implement an "in-memory" database, in which volatile (e.g., non-disk-based) memory (e.g., Random Access Memory) is used both for cache memory and for storing its entire respective portion of the full database. In some embodiments, the data of data source 110 may comprise one or more of conventional tabular data, row-based data stored in row format, column-based data stored in columnar format, and object-based data. Data source 110 may also or alternatively support multi-tenancy by providing multiple logical database systems which are programmatically isolated from one another. Moreover, the data of data source 110 may be indexed and/or selectively replicated in an index to allow fast searching and retrieval thereof.

Metadata 140 may provide information regarding the structure, relationships and meaning of the data stored within data source 110. Metadata 140 may also include data defining views on the stored data, and queries that may be executed upon the stored data. The views and the queries may conform to object models as described below. According to some embodiments, and as will be described in detail below, one or more of the modeled queries combines aspects of traditional search queries and traditional analytics queries. Metadata 140 may be generated by a database administrator.

Query server 130 generally provides data of data source 110 to reporting clients, such as client 120, in response to instructions (e.g., SQL statements) received therefrom. In some embodiments, query server 130 receives an instruction from client 120. Query server 130 generates an execution plan based on the instruction and on metadata 140. The execution plan is forwarded to data source 110, which executes the plan and returns a dataset based on the SQL script. Query server 130 then returns the dataset to client 120. Embodiments are not limited thereto.

Client 120 may comprise one or more devices executing program code of a software application for presenting user interfaces to allow interaction with query server 130. Presentation of a user interface may comprise any degree or type of rendering, depending on the type of user interface code generated by query server 130. For example, client 120 may execute a Web Browser to receive a Web page (e.g., in HTML format) from query server 130, and may render and present the Web page according to known protocols. Client 120 may also or alternatively present user interfaces by executing a standalone executable file (e.g., an .exe file) or code (e.g., a JAVA applet) within a virtual machine.

Figure 2:
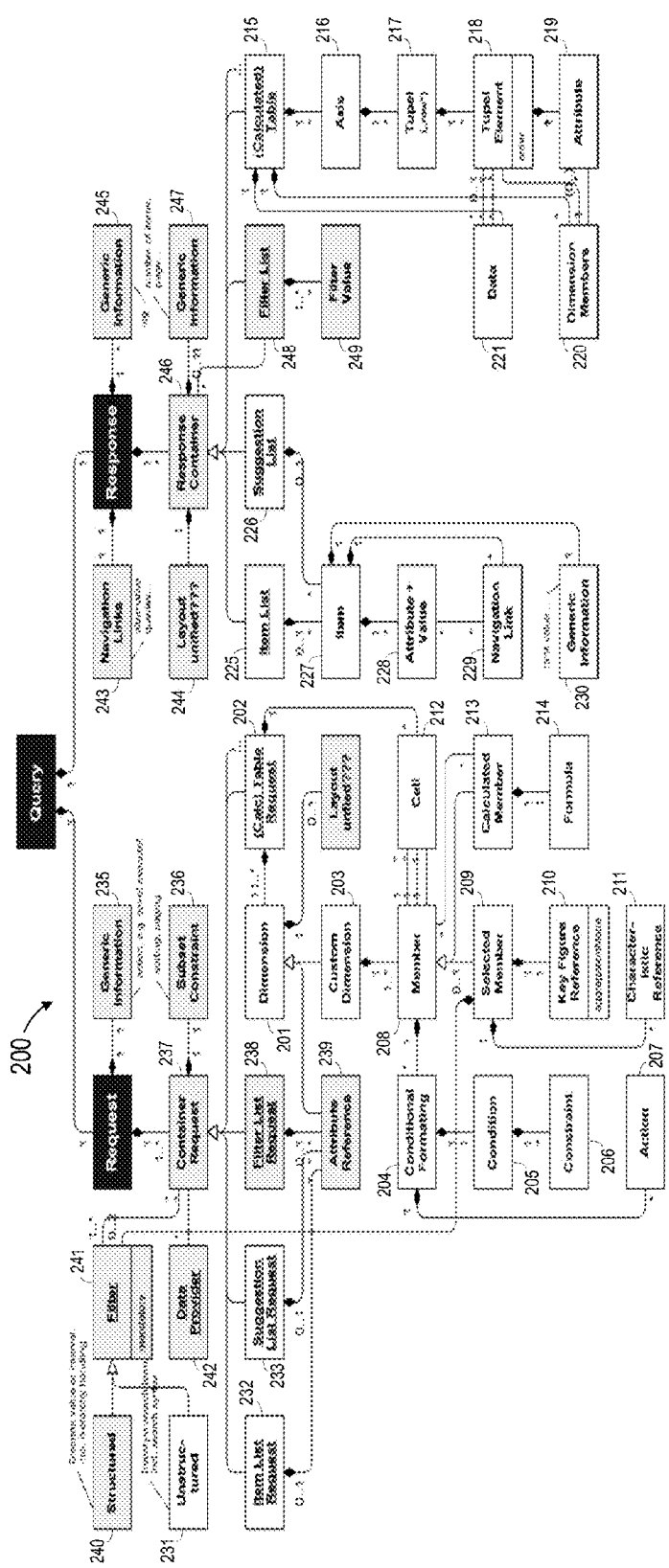
FIG. 2 is an object model according to some embodiments.

FIG. 2 shows runtime object model 200 of a query according to some embodiments. Object model 200 includes artifacts 201-221 which are relevant for analytics, artifacts 225-233 which are relevant for search, and artifacts 235-249 which are relevant for both. For the sake of simplicity, object model 200 leaves out most of the associations (e.g., how the response entities refer to the respective request entities).

The illustrated query includes two basic result types: an item list for a search result, and a table (maybe also one-dimensional) for analytical data. According to some embodiments, the query can execute several search requests and several analytic requests at the same time, on a (at least partly) common filter set.

In some embodiments, there will be no separation of design time and runtime. On designing a query, the results are displayed immediately, and every consumer (assuming the relevant authorizations) is able to change a query definition. Accordingly, all metadata of the query is contained in the request part. Also, the request part is identical to the static model of the query, so that the request can be persisted.

According to object model 200, the overall response of a query consists mainly of Response Containers 246, as described below. However, it is also possible not to execute a query, but rather to save its metadata, in which case no data is returned. The response includes Generic Information artifact 245, which may contain a log of messages concerning the metadata (e.g., "query has been successfully saved"). In the case of a search-type query, a response may also yield possible alternative requests (e.g., "did you mean"-queries) to account for typographical errors of a user. General, any resources relevant on the level of the total query can be indicated in Navigation Links artifact 243.

The actual response data of the query execution is contained in Response Containers 246. Container types include Item List 225, Calculated Table 215, and Filter List 248, but are not limited thereto. A Response Container 246 may include Generic Information 247, such as a number of returned items/tuples, the current page, etc. Layout 244 may include layouting information of a unified layout model.

Item List 225 may be similar to a conventional search result list. Item List 225 contains many Items 227, each of which may include additional information in the form of attributes and their respective values within Attribute+Value 228. A response attribute may represent a whole attribute group.

An Item may also include Navigation Links 229, such as a Uniform Resource Identifier for the resource (described below) and links corresponding to other navigation features: navigation within the object; drilling down the object's structure; navigation within the data as a follow-up search; and navigation to the outside world (e.g., an Enterprise Resource Planning transaction, or a Web address). A Navigation Link 229 may represent navigation for a specific attribute. Accordingly, model 200 includes an association that binds an Attribute Value 228 with a Navigation Link 229. Generic Information 230 may include the ranking value of an Item, why-found information, text snippets, etc.

The Suggestion List 226 is a container used for a suggestion service. The container may be similar to the Item List 225. For example, Suggestion List 226 may contain a specified number of Items 227, with each having a small number of Attribute Values 228 (i.e., usually exactly one value). The distinction between Suggestion List 226 and Item List 225 is intended to reflect that Suggestion List 226 reflects a more specific use case.

The result of an analytical request is contained in a Calculated Table-type of container 215. Axis 216 defines the axis and Tupel 217 defines the group of attributes arranged on an Axis 216. A Tupel Element 218 normally refers to a Dimension Member 220, which can be either an Attribute 219 (drill-down attribute), a Selected Member 209, or a Calculated Member 213. A Dimension Member 220 may be represented by several atomic attributes—for instance, by a key and a language-dependent description. This level is reflected by Attribute 219.

Filter List container 248 provides a kind of value help, by facilitating the display of selected, prominent values of the filter attribute from the start, so that there is no need for typing. Filter List container 248 may refer to a Filter 241 and list in Filter Value 249 a few useful values (e.g., the five most frequently-used values) for the Filter. Filter Lists 248 may serve the other container types as an auxiliary entity, and hence they can be shared by several other containers. Therefore, a Response Container 246 may refer to an arbitrary number of Filter Lists 248.

The overall Request consists mainly of a set of Container Requests 237, and also includes Generic Information 235. Generic Information 235 holds action information. In this regard, because modeling and execution are performed by one and the same service in some embodiments, the intended reactions of the query server might not be self-evident (e.g., execute a transient query, execute and save the query, persist the query without executing it, etc.).

A Filter 241 represents any kind of constraint on the data pool. In search, the most prominent filter is the freestyle-search string, contained in the Unstructured artifact 231. Structured information such as filter criteria may be contained in the Structured artifact 240. These filter criteria may include discrete values, intervals with inclusion and exclusion options, and even criteria relating to hierarchies. Filters 241 are autonomous entities, which can be referred to from several entities, such as from Container Request 237. Shared filters are realized if several Container Requests 237 refer to the same Filter 241.

The Container Request 237 is a generalization of the three container types—Item List Request 232, Calculated Table Request 233, and Filter List Request 238. This enumeration of container types may be enhanced in some embodiments. The information common to each Container Request 237 type may include: Data Provider 242 specifying the view on which the query operates. In case of search, the request may consider several views. Since the Data Provider 242 is bound to the Container Request 237, it becomes possible to execute analytics on one view, while running a document/text search on another view, with both sharing the same filter criteria. Each Container Request may also specify a Subset Constraint 236 indicating how many result items/tupels to return, sorted according to which criteria, and how many items/tuples to skip.

The Item List Request 232 specifies what attributes of the underlying view(s) are to be returned with each Item 227. Attribute Reference 239 points to such a view attribute (i.e., it contributes an alias for the referred attribute, which may be needed at least in the case of federated access to several Data Providers). Attribute Reference 239 may be used jointly with the analytical request, where it acts as a drill-down attribute for plain dimensions, such as product, customer, sales representative, etc.

Suggestion List Request 233, like the Item List Request 232, points to Attribute References 239 as where to check for terms fitting to the input. The Data Provider 232 on the level of the Container Request 237 specifies where to check for completions, and the corresponding Filter (Unstructured) 231 may contain the user input received this far.

A query has at least one Dimension 201. Dimensions 201 are the constructs that can be used for analysis. The Dimension 201 may carry some attributes that control the UI behavior of the query, such as where and how sums and subtotals are to be built and to be displayed.

A Dimension 201 can be an Attribute Reference 239, which has a reference to a characteristic of the underlying view. An Attribute Reference 239 might also refer to a hierarchy: for instance, employees may be arranged by their cost center, profit center, projects, and so on; and time-dependency can be considered in different ways. The Attribute Reference 239 can choose one of the hierarchies for displaying the characteristic.

A Dimension 201 can be a result structure. This is a grouping entity in that a result structure can contain one or more Members 208. A result structure can be seen as a Custom (user defined) Dimension 203.

A Member 208 is an abstract entity defining the instance of a Custom Dimension 203. While the Custom Dimension 203 may be a grouping entity like Attribute Reference 239, the Member 208 represents the actual instance, such as the value of an Attribute Reference 239.

A Selected Member 209 may represent a kind of sub-query. It yields exactly one key figure, and this key figure can be restricted by one or more constraints on characteristics. Therefore, a Key Figure Reference 209 is also included, which can keep or override the aggregation mode proposed by the corresponding view attribute, and several Characteristic References 211, which hold the constraints in their filter part.

A Member 208 can be a Calculated Member 213. In this case, the content of Cell 212 is calculated from several other Members 208 via a Formula 214. The Cell 212 has three associations to the Member 208. Two of the associations refer to the Members 208 that define the cell. The third association defines the actual settings of the Cell 212.

Conditional Formatting 204 may be used in order to facilitate fast visual access to a query result. Conditional Formatting 204 may be dependent on the actual numbers of the query result. Possible associated Actions 207 include painting a cell, a column, or a row in a certain color.

Conditional Formatting 204 is placed at the Member 208 it is meant to influence. The Condition 205 might be triggered by other attributes, and the Constraint 206 defines the context in which the Condition 205 becomes applicable (e.g., works only on the level of months).

Subset Constraint 236 defines how the result of the query is to be sorted. Sorting may occur, for example, according to drill-down attributes (e.g., customers in alphabetical order) or members (e.g., aggregated revenue descending). Sorting can also be performed according to several attributes, as long as they belong to the same dimension.

The Filter List Request 238 specifies that a Filter List—a kind of value help, as explained above—is requested. The Filter List Request 238 has an Attribute Reference 239, which in turn points to a view attribute. Filtering is possible only for Dimensions 201 of the type Attribute Reference 239, which is trivial for search (as there are no other dimension types).

According to some embodiments, a Filter List Request would automatically act on all Item List Containers 225 and Calculated Table Containers 215, based on the identity of the Attribute Reference 239 used by each of them.

Figure 3:
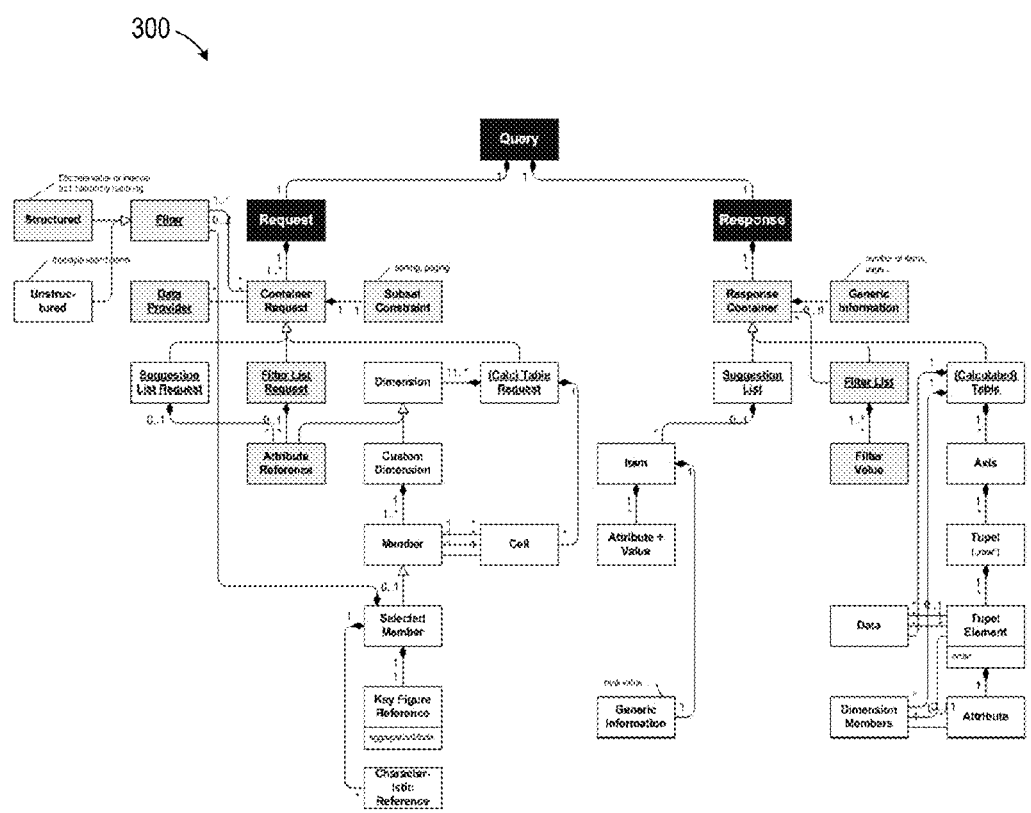
FIG. 3 is an object model according to some embodiments.

FIG. 3 illustrates object model 300 of a query according to some embodiments. Object model 300 might facilitate a simpler implementation in some embodiments, as shown, certain search aspects are omitted in comparison to object model 200 (e.g., Item List, etc.). The analytical aspects are also pared down to support only simpler use cases.

Runtime-authoring implies a user interface in which a user can create, change, and execute queries interactively without realizing this is being done. Such authoring requires that the query runtime interface includes all model information of the query, which in turn implies that the static query can be derived from the runtime representation.

Figure 4:
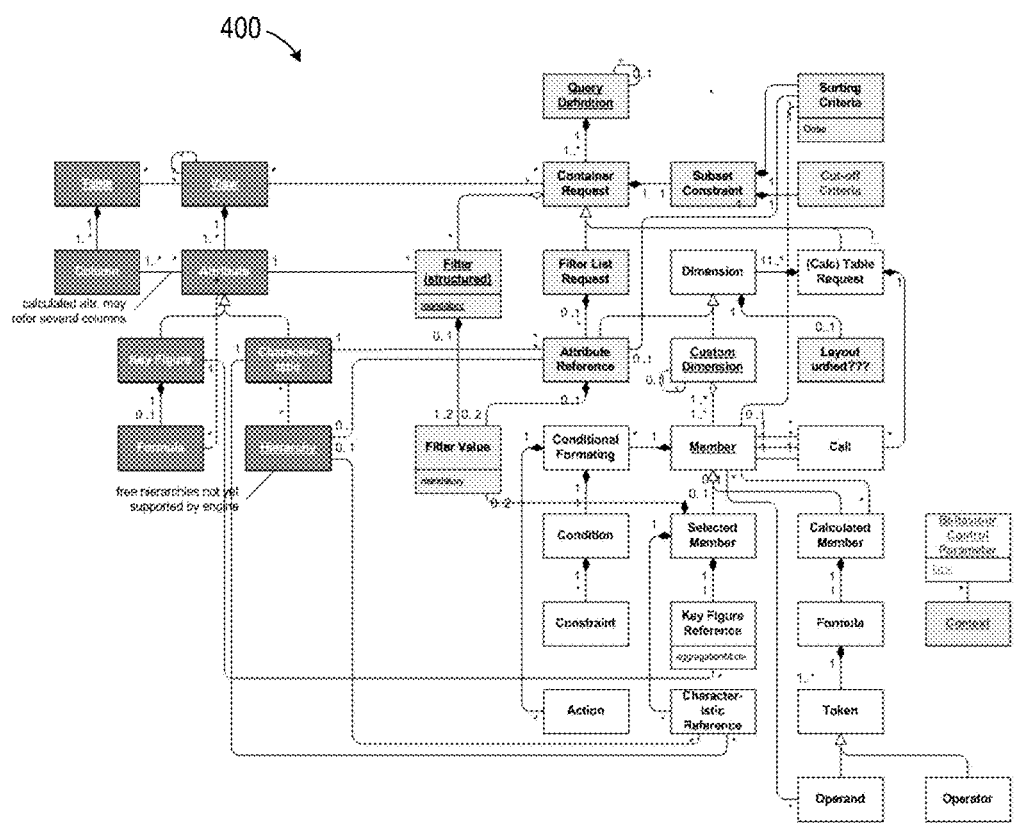
FIG. 4 is an object model according to some embodiments.

FIG. 4 illustrates such a static query 400, as a subset of query 300 of FIG. 3. Query 400 is embedded in the model context of the view. For analytical requests, there will be a single anchor view. Search, in its federated aspect, will make use of several views. Each container can deal with a different anchor view, while sharing the same filter criteria.

In order to use such a persisted query, a service retrieves the complete (from a runtime point of view) metadata of a query for a given query ID. For example, a GET service may be used to determine a query ID and a RETRIEVE METADATA service may be used to retrieve the metadata for a given query ID. The metadata is used to present the query to the user, who then sets the additional filters. The query can then be executed, and, in doing so, the complete metadata is passed to the server in the request. Such a process results in no difference between a persisted query and a transient query.

Runtime authoring also requires that a query is persisted by the end user. Persisting a query can be seen as a snapshot of a transient query upon which the user operated. Therefore, the query request includes an action-parameter. This parameter may typically instruct execution of the query, but it can be also set to instruct saving of the query, or saving and execution of the query. For deletion of the query, the same parameter can be set to "delete", in which case it is not necessary to transmit all the metadata to the server.

Figure 5:
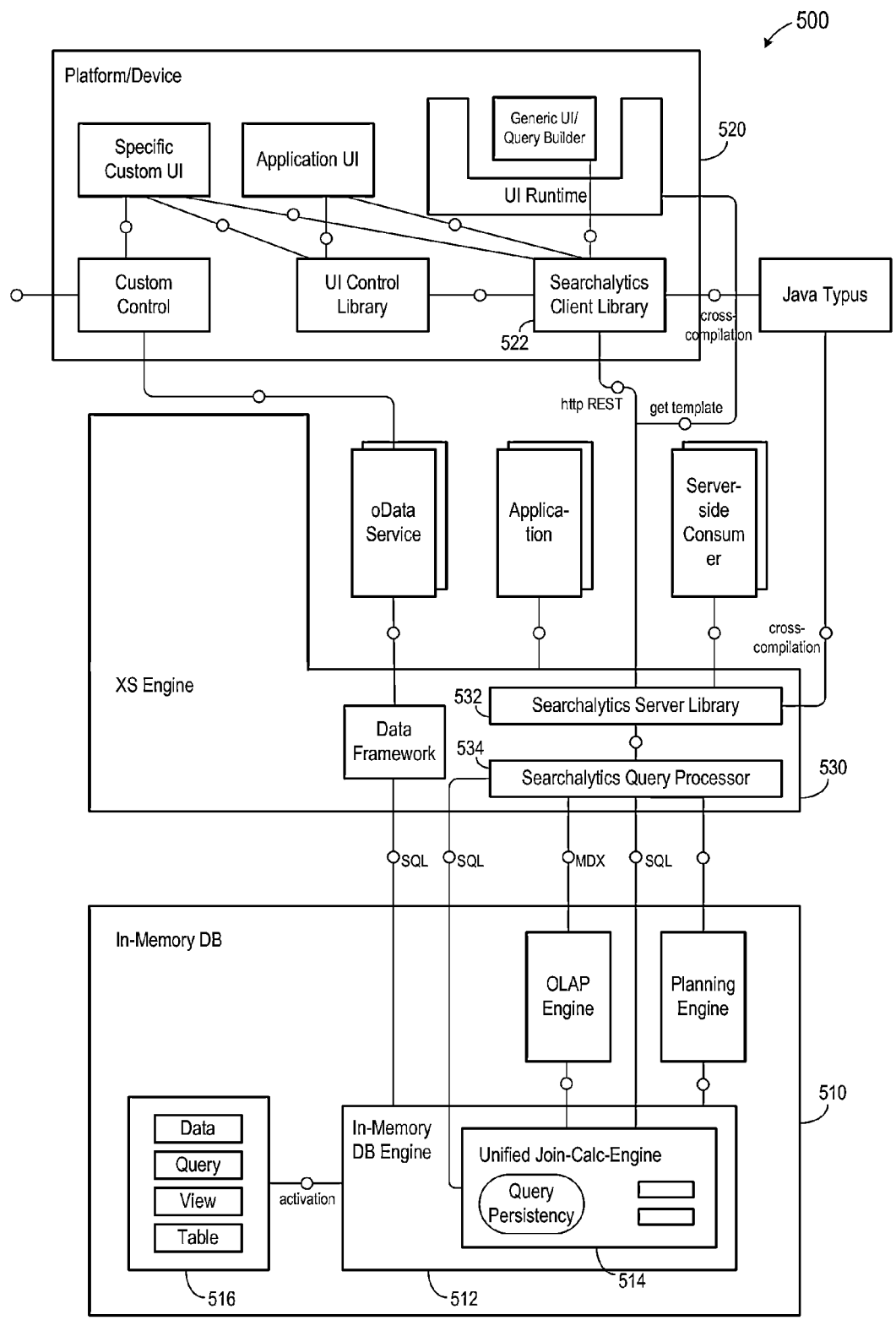
FIG. 5 is a block diagram of a system architecture according to some embodiments.

FIG. 5 is a block diagram of architecture 500 according to some embodiments. Architecture may support the query object models discussed herein. In some embodiments, architecture 500 is an implementation of system 100 of FIG. 1. More specifically, in-memory database 510 is an implementation of data source 110, platform/device 520 is an implementation of client 120, and XS engine 530 is an implementation of query server 130.

Platform/device 520 includes client library 522 to support the search and analytics (depicted as "searchalytics") query functionality described herein. Such functionality may include query configuration. Server library 532 provides similar support via a similar interface in order to implement a server-side consumer of this functionality. In some embodiments, client library 522 and server library 532 are implemented in Java and cross-compiled to relevant languages (including C++ for the server).

For plain search requests, query processor 334 calls engine 512 via Structured Query Language. Query processor 334 transforms and routes analytic requests to the calculation engine 514. The query model can be persisted in the catalog, such that query processor 334 reads this model data, and creates new data in case of new or changed queries. Calculation engine 514 executes the query plan on pre-defined analytics views.

Repository 516 includes a joint "view" definition, as opposed to conventional separation into attribute- and analytic views. Such a definition may facilitate performance of analytics on attribute views (e.g., average age of customers per product) and to text search on analytic views (e.g., to determine filter values).

A new repository object "query" may serve as a persistency for the configuration of the functionality described herein. Artifacts related to this query are not contained in the "view" configuration.

The following discussion relates to the fulfillment of received requests which conform to the query object model. Starting from the user interface (UI), a request may include several facets such as analytical facets and search result lists. These facets are linked by join filters, but not all filters apply to each facet. The analytical facets can typically be provided by a single data table. However, search results may come from different data sources, and, due to federation, a search result is likely to correspond to several data providers. As a result, the query is a conglomerate query, regardless of the number layers in which it is configured.

Figure 6:
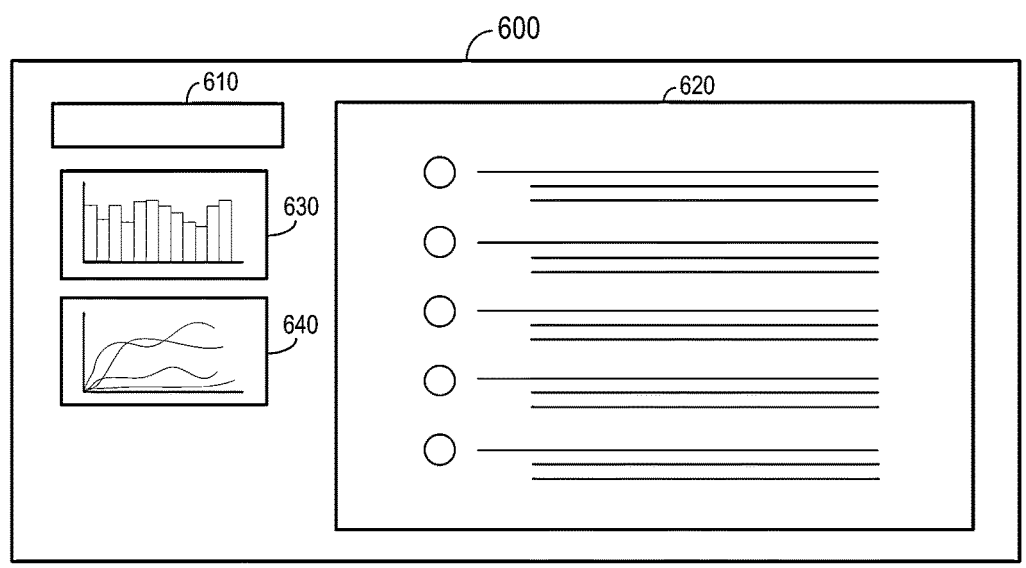
FIG. 6 is a representation of a user interface according to some embodiments.
Figure 7:
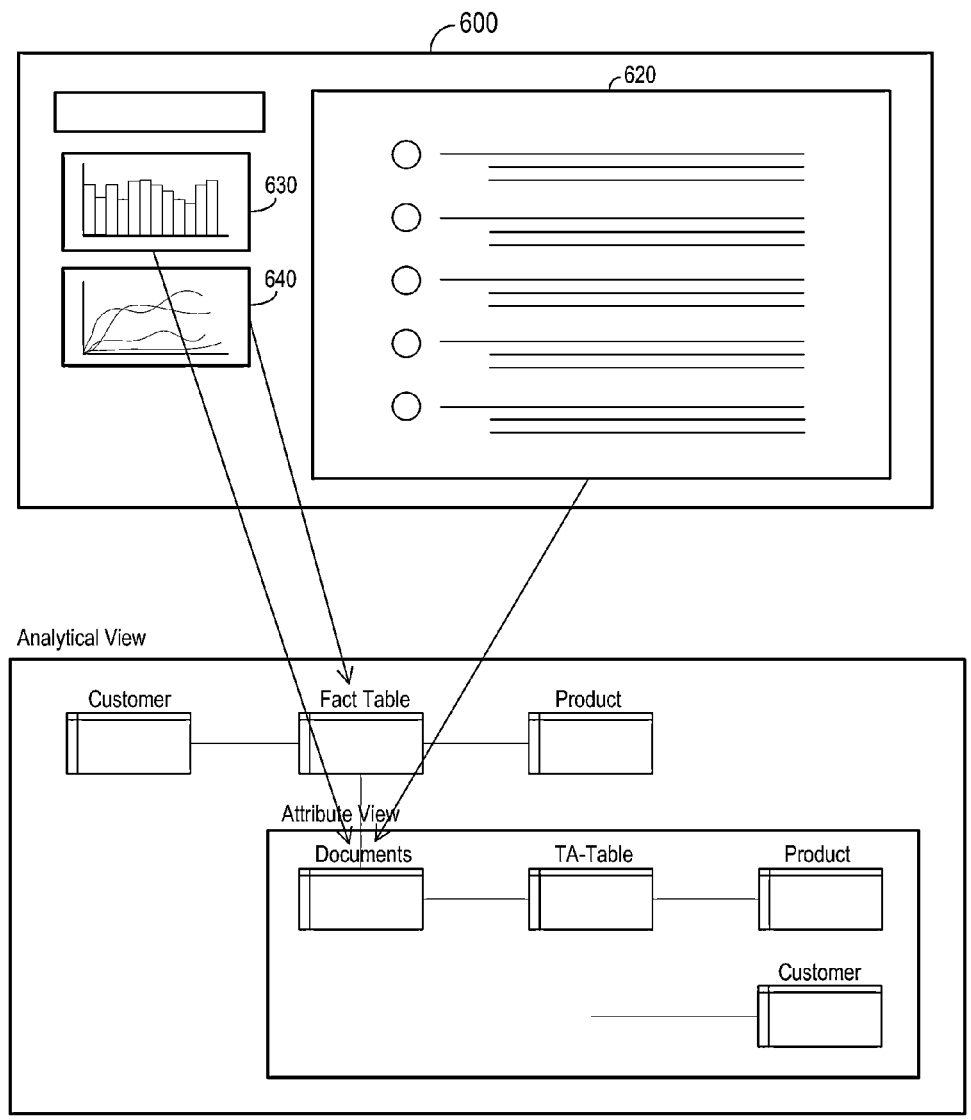
FIG. 7 illustrates interconnection of sub-queries based on different views according to some embodiments.

FIGS. 6 and 7 provide an example of a query according to some embodiments. Specifically, a user may input search terms (e.g., a company name) into search box 610 of user interface 600. As a result, a list 620 of matching documents is displayed. In this regard, previous processing may have included scanning hardcopies of the documents, extracting product and customer information cited therein, and stored this structured information in a separate database table.

Based on the displayed list 620, the facets execute count on the text analysis result, displaying, e.g. in bar chart 630, the products and customers mentioned most frequently in the listed documents. Line chart 640 may illustrate the frequency of a product citation over time. Facets 620-640 are interconnected in that each can set filters and each reacts on filters set by others.

It will now be assumed that line chart 640 instead displays the revenue generated by the products over time. The time axis and the set of products of line chart 640 remain the same. However, "revenue" is a calculated key figure used in a complex analytical query that produces the data on a time axis. Such a complex analytical query cannot be formulated on the documents table—resulting in the need for a query based on two views. According to some embodiments, a join filter is defined in a way that can be executed in a single step (i.e., independent, parallel execution of all subrequests).

In order to define the join filter in some embodiments, the whole attribute view is included into the analytic view as an additional spoke of the star schema. FIG. 7 illustrates this concept. As shown, the join between the anchor table of the analytical view and the embedded attribute view is defined on the view attributes that refer to the product ID and the customer ID. Thus, both views are coupled, and applying text search criteria automatically reduces the result set of the analytical view.

Therefore, in some embodiments, engine 530 receives a request conforming to a modeled query and join filter criteria (i.e., a join condition). The request includes a first subrequest associated with a search attribute view and a second subrequest associated with an analytical view. A join is defined between the search attribute view and the analytical view based on one or more view attributes of the search attribute view, and a result set associated with the first subrequest is filtered based on the join and on the join filter criteria.

The number of attributes used in the join condition also defines the degrees of freedom for the interaction between the facets. A single attribute indicates that only one filter type influences the complex facets, so the attribute remains unchanged whenever another filter is set. The more attributes in the join condition, the more natural the inclusion of the analytical view.

As also shown in FIG. 7, only the complex facet 640 is based on the coupled views. The other facets 620 and 630 continue to refer to the attribute view.

Figure 8:
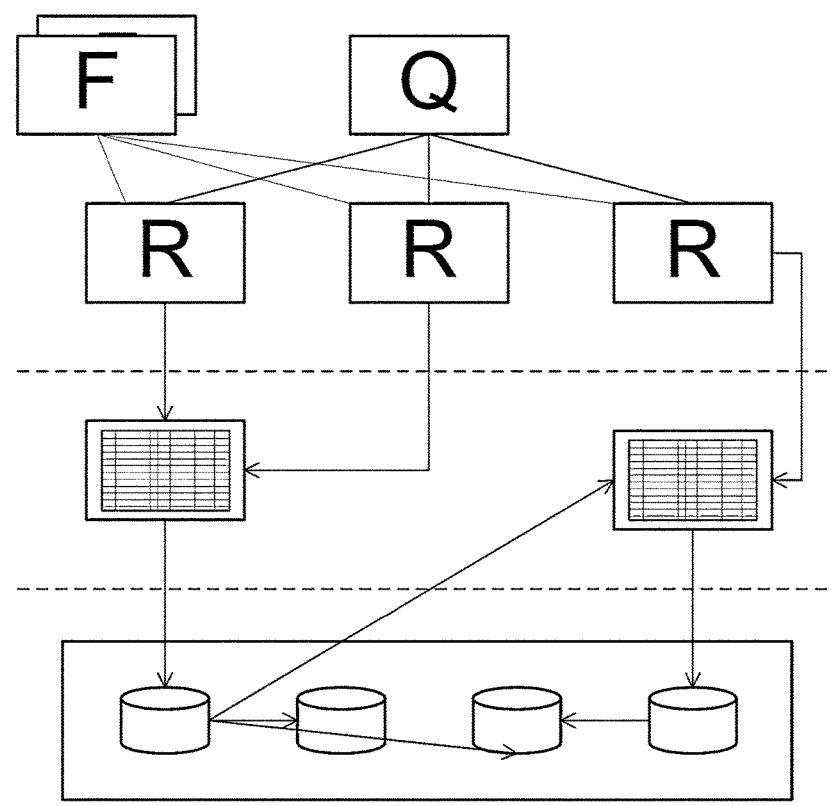
FIG. 8 illustrates interconnection of sub-queries based on different views according to some embodiments.

FIG. 8 further illustrates interconnection of sub-queries based on different views. Specifically, FIG. 8 illustrates how one query Q is based on several views R, which in turn use the same database tables. Facets F may similarly use the views R of query Q as described above.

Although the facets described above relate to counting occurrences, facets are not limited thereto. Potentially, a facet could be fed by a complex query. The counting-related facets may modeled as an analytically-"flavored" query, in which the item ("author", "date", "price") is considered a member. A calculated member may yield the number by means of a definition such "COUNT DISTINCT doc_id", when dealing with a typical search result UI. Facets oftentimes work with intervals, for instance for "date" or "price". The interval can be mapped as a "selected member" of the query.

A Key Performance Indicator (KPI) is a single figure, like "weighted sales pipeline value". For KPIs, a query may be defined with a one-dimensional output, i.e., the result set consists of a table with one row and one column (plus column ID/description). Filter criteria is defined on the underlying View's attributes, which need not be included as "members". The query as intended here does not support a single query based on several data providers. Consequently, if a KPI is calculated from data which is found in different data providers, the consolidation into a single data provider is accomplished on the level of the View. The query contains furthermore a single calculated member.

This type of query, having one-dimensional output, may be called a "calculated key figure" (CKF). A CKF can use other CKFs as input, and may be defined by a complex tree of CKFs until the actual data basis is reached. CKFs may consolidate a company's concepts and definitions. CKFs may be reused in all queries. For example, "revenue" may be defined as a CKF because it is too complex to be defined by every user who works on queries, and because a change to the "revenue" concept should act centrally on all relevant queries.

Figure 9:
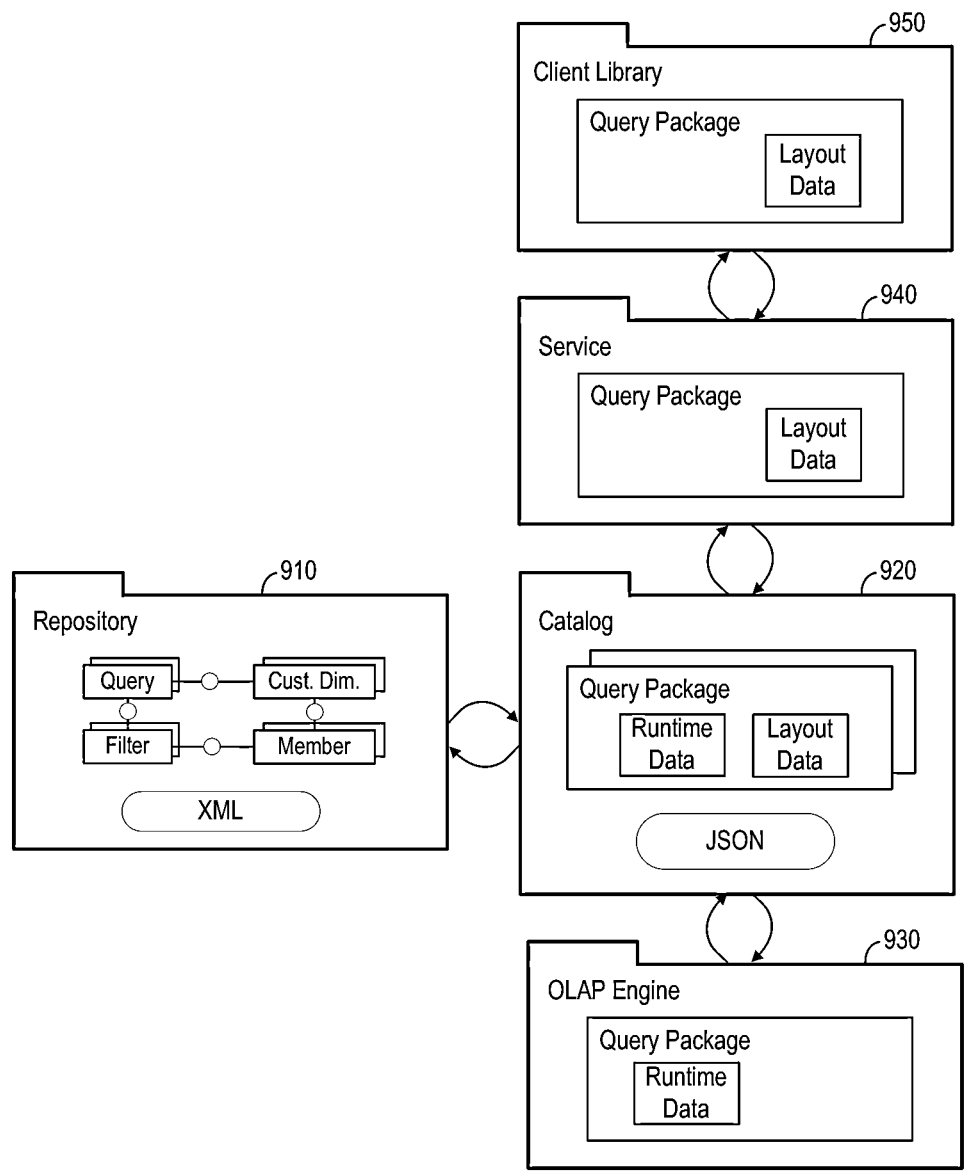
FIG. 9 illustrates query usage according to some embodiments.

A Query according to some embodiments exists at different places within a system in which it is implemented. At these different places, the Query may be used in different flavors and for different purposes. FIG. 9 illustrates where the Query occurs within implementations according to some embodiments.

First, the Query is defined by metadata in repository 910, as received from a design time tool or via runtime authoring. The repository aspect reflects the static Query model discussed above. Repository 910 may contain the complete range of metadata in eXtended Markup Language (XML) format.

At runtime, it is important to efficiently read Query metadata, and to efficiently provide communication partners likewise with what they need. Consequently, the repository objects are serialized, across all versioning and reuse, into a comprehensive model on the granularity of the Query. According to some embodiments, the Query is persisted in catalog 920 in JavaScript Object Notation (JSON). On the other hand, in order to allow a user to search for Queries, a large portion of a Query's metadata should be available in transparent database tables. The Query model will therefore be persisted twice in its runtime aspect.

The Query runtime model serves OLAP engine 930 which actually executes the Query, and service 940 that transports the request and the result. The Query models used by these two components should be similar to the Query runtime model. The needs of each consumer are different: only metadata relating to the Query execution (e.g. the underlying View) is relevant for OLAP engine 930; and layout-related metadata is relevant for UI-supporting service 940.

Client library 950 consumes service 940 and exposes a Query model via an Application Programming Interface (API). The API may directly correspond to the service 940 but this correspondence is not required.

Figure 10:
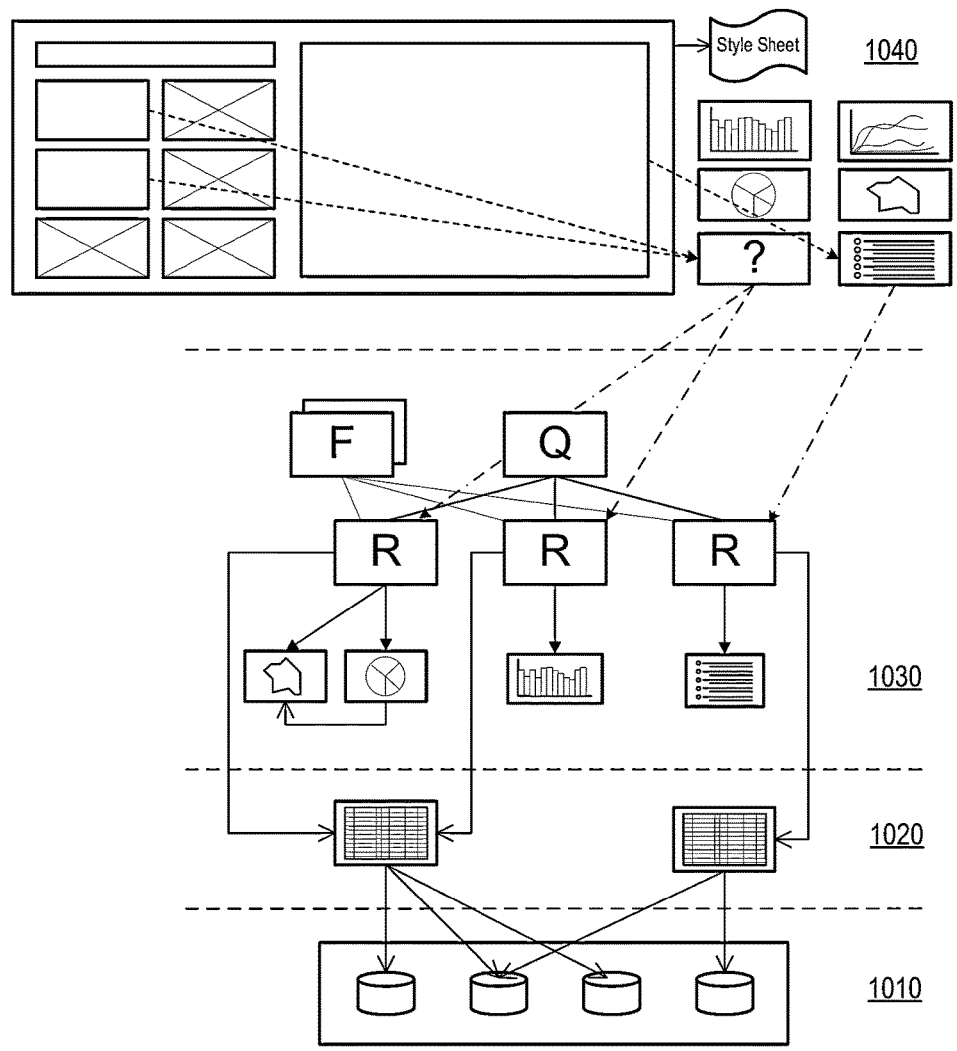
FIG. 10 illustrates layering of logical entities according to some embodiments.

FIG. 10 illustrates the principal of layering according to some embodiments. Bottommost layer 1010 includes the database with its tables. Views 1020 build upon layer 1010. In some embodiments, three different types of Views are to be consolidated into a single type. Independent from this consolidation, there may be different View instances on the same data, based on different use cases. For example, a View for analytical purposes may use an anchor table that consists mainly of key figures and measures. A View for searching may instead use "master data" as an anchor table, and the anchor table of the first View might be used in a subordinate role for defining joins between several "master data" tables.

Next layer 1030 is built as defined above. Specifically, conglomerate Query Q comprises requests and responses for many containers, which can be of the type "table", "list", or "suggestion". The filter criteria are partly common to some of the containers, and partly locally-defined. All analytical containers may share the same View, used as the data provider. The search container tends to refer to another View as the data provider. Because of federation, the search container may refer to many Views.

The Query is a concept independent of an actual UI. It may be reusable in many contexts, ranging from different platforms to server-side publishing or an Excel-plug in. Therefore, it is not necessary to put all the information relevant for a client application into the Query definition, and the client application is instead defined in layer 1040.

The actual UI layout is defined in layer 1040 by a customer-specific application, or as a generic UI. The UI layout contains the interaction paradigm, e.g., a search box and a central container, flanked by some containers for less-important information. Headings and a style sheet for the application defined in layer 1040, as well as the scope in terms of platforms, user roles, and so on.

Layer 1040 as a whole refers to a Query and its containers each refer to a control. The control in turn refers to a result set container of the Query. A client application is free to ignore the settings done on Query level and to instead directly refer to a concrete control, overriding the suggestion by the Query. Normally, the application would accept the Query's suggestion (e.g., in case of complex graphics like nested graphics, the application may not be capable to define it in a modeled way), but in this case, the application may refer to a surprise-chart type that inherits at runtime a chart defined on the Query level. In case the Query has no default chart type, the runtime will yield an error message.

Figure 11:
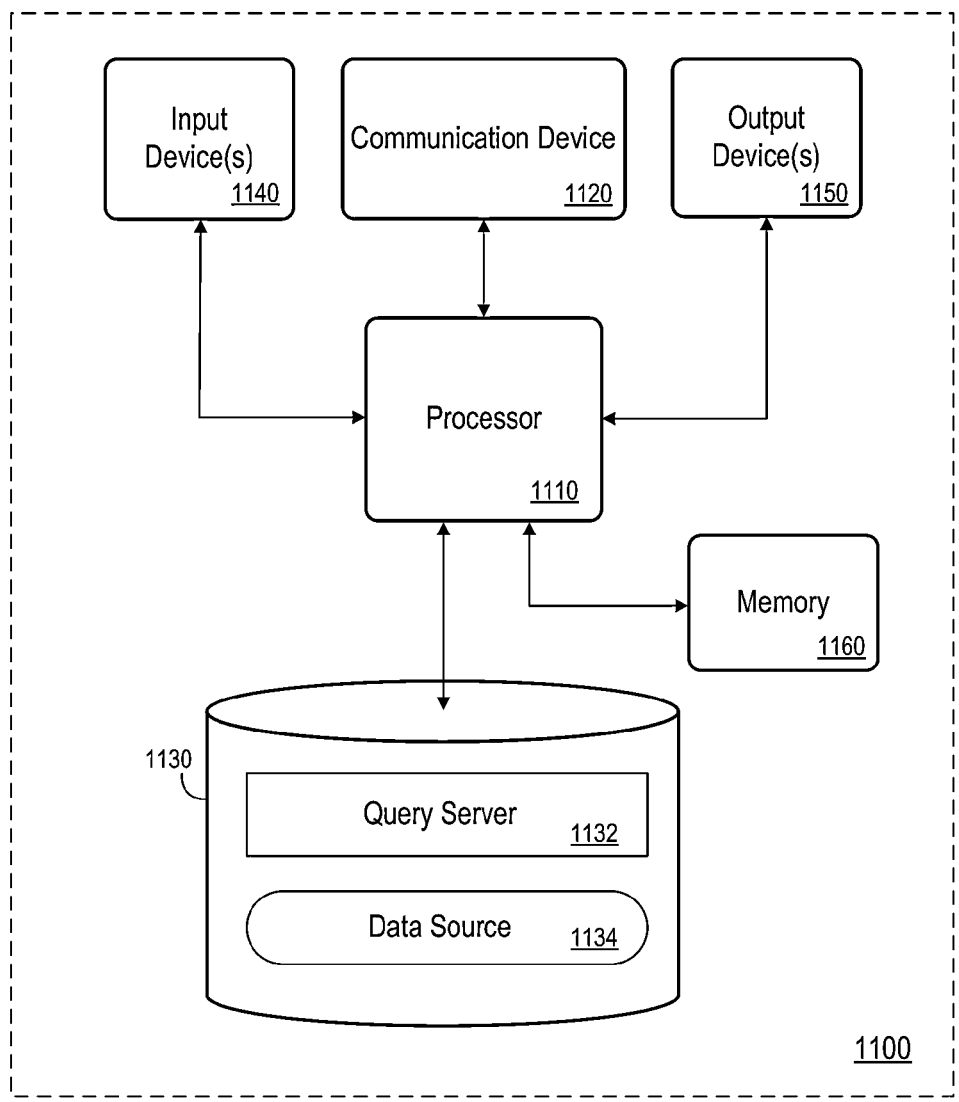
FIG. 11 is a block diagram of an apparatus according to some embodiments.

FIG. 11 is a block diagram of apparatus 1100 according to some embodiments. Apparatus 1100 may comprise a general-purpose computing apparatus and may execute program code to perform any of the functions described herein. Apparatus 1100 may comprise an implementation of query server 130 and data source 110, and/or an implementation of XS engine 530 and in-memory database 510. Apparatus 1100 may include other unshown elements according to some embodiments.

Apparatus 1100 includes processor 1110 operatively coupled to communication device 1120, data storage device 1130, one or more input devices 1140, one or more output devices 1150 and memory 1160. Communication device 1120 may facilitate communication with external devices, such as a reporting client, or a data storage device. Input device(s) 1140 may comprise, for example, a keyboard, a keypad, a mouse or other pointing device, a microphone, knob or a switch, an infra-red (IR) port, a docking station, and/or a touch screen. Input device(s) 1140 may be used, for example, to enter information into apparatus 1100. Output device(s) 1150 may comprise, for example, a display (e.g., a display screen) a speaker, and/or a printer.

Data storage device 1130 may comprise any appropriate persistent storage device, including combinations of magnetic storage devices (e.g., magnetic tape, hard disk drives and flash memory), optical storage devices, Read Only Memory (ROM) devices, etc., while memory 1160 may comprise Random Access Memory (RAM).

Query server 1132 may comprise program code executed by processor 1110 to cause apparatus 1100 to perform any one or more of the processes described herein. Embodiments are not limited to execution of these processes by a single apparatus. Data source 1134 may implement data source 110 and/or database 510 as described above. As also described above, data source 1134 may be implemented in volatile memory such as memory 1160. Data storage device 1130 may also store data and other program code for providing additional functionality and/or which are necessary for operation of apparatus 1100, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 and/or system 500 may include a processor to execute program code such that the computing device operates as described herein.

All processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a computing device comprising:
   a memory storing processor-executable program code; and
   a processor to execute the processor-executable program code in order to cause the computing device to:
   receive a request conforming to a modeled query and join filter criteria associated with join conditions, the request comprising a first subrequest associated with a text search result item list and a second subrequest associated with an analytical view and a table for data of the analytical view;
   receive, via a get service, a query ID associated with the modeled query;
   retrieve metadata associated with the query ID to be transmitted to a user, the metadata generated by a database administrator;
   transmit the modeled query based on the metadata to the user;
   receive an additional join filter from the user wherein the additional join filter comprises additional join filter criteria and is based on the received modeled query;
   define a join between the text search result item list and the table, the join associating one or more attributes of the text search result item list with one or more facets of the table, wherein definition of the join comprises embedding of the text search result item list into the table;

receive search results corresponding to the text search result item list; and filter the search results and a result set of data of the analytical view based on the join, the join filter criteria and on the additional join filter criteria.

2. The system according to claim 1, wherein the analytical view comprises at least one calculated member and the text search result item list comprises at least one item.

3. The system of claim 1, wherein the search results further comprise a generic information artifact comprising a log of messages associated with the metadata.

4. A non-transitory computer-readable medium storing program code, the program code executable by a processor of a computing system to cause the computing system to:

receive a request conforming to a modeled query and join filter criteria associated with join conditions, the request comprising a first subrequest associated with a text search result item list and a second subrequest associated with an analytical view and a table for data of the analytical view;

receive, via a get service, a query ID associated with the modeled query;

retrieve metadata associated with the query ID to be transmitted to a user, the metadata generated by a database administrator;

transmit the modeled query based on the metadata to the user;

receive an additional join filter from the user wherein the additional join filter comprises additional join filter criteria and is based on the received modeled query;

define a join between the text search result item list and the table, the join associating one or more attributes of the text search result item list with one or more facets of the table, wherein definition of the join comprises embedding of the text search result item list into the table;

receive search results corresponding to the text search result item list; and filter the search results and a result set of data of the analytical view based on the join, the join filter criteria and on the additional join filter criteria.

5. The medium according to claim 4, wherein the analytical view comprises at least one calculated member and the text search result item list comprises at least one item.

6. The medium of claim 4, wherein the search results further comprise a generic information artifact comprising a log of messages associated with the metadata.

7. A computer-implemented method comprising:

receive a request conforming to a modeled query, the request comprising a first subrequest associated with a text search result item list and a second subrequest associated with an analytical view and a table for data of the analytical view;

receive, via a get service, a query ID associated with the modeled query;

retrieve metadata associated with the query ID to be transmitted to a user, the metadata generated by a database administrator;

transmit the modeled query based on the metadata to the user;

receive an additional join filter from the user wherein the additional join filter comprises additional join filter criteria and is based on the received modeled query;

define a join between the text search result item list and the table, the join including one or more view attributes of the text search result item list with one or more facets of the table, wherein definition of the join comprises embedding of the text search result item list into the table;

receive search results corresponding to the text search result item list; and filter the search results and a result set of data of the analytical view based on the join, the join filter criteria and on the additional join filter criteria.

8. The method according to claim 7, wherein the analytical view comprises at least one calculated member and the text search result list comprises at least one item.

9. The method of claim 7, wherein the search results further comprise a generic information artifact comprising a log of messages associated with the metadata.

* * * * *